United States Patent
Greenwood et al.

(10) Patent No.: US 11,408,515 B2
(45) Date of Patent: Aug. 9, 2022

(54) PRESSURE REGULATOR HAVING AN OBLIQUE VALVE SEAT

(71) Applicant: NELSON IRRIGATION CORPORATION, Walla Walla, WA (US)

(72) Inventors: Riley D. Greenwood, Walla Walla, WA (US); Craig Nelson, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 366 days.

(21) Appl. No.: 16/776,072

(22) Filed: Jan. 29, 2020

(65) Prior Publication Data

US 2021/0231221 A1   Jul. 29, 2021

(51) Int. Cl.
| | | |
|---|---|---|
| F16K 1/42 | (2006.01) | |
| G05D 16/06 | (2006.01) | |
| F16K 1/36 | (2006.01) | |
| F16K 27/02 | (2006.01) | |

(52) U.S. Cl.
CPC ............... *F16K 1/42* (2013.01); *F16K 1/36* (2013.01); *F16K 27/02* (2013.01); *G05D 16/0658* (2013.01)

(58) Field of Classification Search
CPC . F16K 1/42; F16K 1/36; F16K 17/048; F16K 27/02; Y10T 137/7793; Y10T 13/7808; Y10T 13/781; Y10T 13/7812; Y10T 13/782; Y10T 13/7806; Y10T 13/7782; Y10T 13/7762; Y10T 13/7797; G05D 16/0658; G05D 16/065; G05D 16/0636; G05D 16/103; G05D 16/0608; G05D 16/187; B05B 12/087
See application file for complete search history.

(56) References Cited

U.S. PATENT DOCUMENTS

| | | | |
|---|---|---|---|
| 5,875,815 A | | 3/1999 | Ungerecht et al. |
| 5,904,338 A | * | 5/1999 | Unruh ....................... F16K 1/36 |
| | | | 137/527 |
| 6,374,853 B1 | | 4/2002 | Callies |
| 6,758,238 B2 | | 7/2004 | Callies |
| 7,401,622 B2 | | 7/2008 | Ungerecht |
| 11,144,077 B2 | | 10/2021 | Weingarten |

(Continued)

FOREIGN PATENT DOCUMENTS

| | | |
|---|---|---|
| WO | 2016189466 | 12/2016 |
| WO | 2018163161 | 3/2018 |
| WO | 2018217623 | 11/2018 |

OTHER PUBLICATIONS

PCT/US2021/015186, International Search Report, dated Apr. 4, 2021 (4 pages).

*Primary Examiner* — Kelsey E Cary
(74) *Attorney, Agent, or Firm* — Nixon & Vanderhye P.C.

(57) ABSTRACT

A pressure regulator including: a housing including an inlet flow passage and an outlet flow passage; a plunger reciprocally mounted in the housing and including a plunger flow passage; an inlet to the plunger flow passage, wherein the inlet is aligned with a plane oblique to an axis of the plunger flow passage; and a valve seat fixed to the housing and positioned between the inlet flow passage and the inlet to the flow passage of the plunger, wherein the valve seat is configured to receive and abut the inlet to the flow passage of the plunger.

27 Claims, 8 Drawing Sheets

(56) References Cited

U.S. PATENT DOCUMENTS

| | | | |
|---|---|---|---|
| 2007/0284004 A1* | 12/2007 | Ungerecht | G05D 16/0655 |
| | | | 137/505.25 |
| 2012/0285561 A1* | 11/2012 | Lawyer | G05D 16/0608 |
| | | | 137/561 R |
| 2015/0293539 A1* | 10/2015 | Greenwood | G05D 16/0608 |
| | | | 137/505.28 |
| 2018/0120866 A1* | 5/2018 | Drechsel | F16K 1/126 |
| 2019/0317534 A1* | 10/2019 | Nelson | G05D 16/187 |
| 2019/0351435 A1* | 11/2019 | Greenwood | G05D 16/02 |

* cited by examiner

PRESSURE REGULATOR HAVING AN OBLIQUE VALVE SEAT

FIELD OF INVENTION

The invention relates to flow-through pressure regulators in water distribution pipes, and particularly pipes supplying water to irrigation sprinklers.

BACKGROUND OF INVENTION

Irrigation systems often have sprinklers arranged along an extended water supply pipe. For example, a water supply pipe in a center pivot irrigation system may extend a quarter to half a mile (400 to 800 meters). The water supply pipe may have a diameter of six to ten inches (152 to 254 millimeters) and provide water to a hundred or more sprinklers arranged along the pipe. Each sprinkler may be connected to the water supply pipe by a smaller water pipe that extends vertically and includes a pressure regulator that controls the water pressure supplied to the sprinkler. Also, at the end of the water supply pipe may be a high capacity nozzle sprinkler. A pressure regulator may also regulate the water pressure supplied to the high capacity nozzle sprinkler.

The sprinklers are typically designed to receive water under a relatively low pressure as compared to the pressure in the water supply pipe. Also, the sprinklers may be designed to receive water within a narrow pressure range. Pressure regulators reduce the pressure in the water supply pipe to a pressure suitable for a sprinkler. Pressure regulators also ensure that the water pressure is within the design range of the sprinkler.

The water pressure in the water supply pipe of a center pivot irrigation system may vary as the pipe moves in a circle over an agricultural field and pivots about a center water supply. The elevation of the water supply pipe may rise and fall as the pipe travels over the hills and low points of a field. The changes in elevation vary the pressure in the water supply pipe. The pressure in the water supply pipe may also vary due to changes in the water supply pressure and due to other factors. The pressure regulators adjust to the changes in pressure such that water flows to the sprinklers at a relatively uniform pressure.

Nelson Irrigation Corporation of Walla Walla, Wash., U.S.A., manufactures and sells flow-through type pressure regulators having a tubular housing with an inlet at one end and an outlet at the other end. Examples of the pressure regulators are described in U.S. Pat. Nos. 5,257,646; 7,401, 622; 8,567,433 and 9,367,070. Pressure loss through the regulator is controlled by a gap between a valve seat and an inlet to a tubular plunger in the regulator. A conventional valve seat is oriented in a plane perpendicular to the axis of the plunger. Similarly, the inlet to the plunger is also oriented to be perpendicular to the same plane. Water flows through the inlet passage of the housing of the pressure regulator, flows over the strut supporting the valve seat and makes a sharp turn, of about 90 degrees, around the outer circular edge of the valve seat and towards the inlet to the plunger. After flowing around the outer edge of the valve seat, the water turns again about 90 degrees to flow into the plunger and towards the outlet of the pressure regulator.

The conventional valve seat and a strut(s) supporting the valve seat tend to collect debris from the water flow. Water for the sprinklers is often drawn from ponds and irrigation ditches near agricultural fields. The water is dirty with suspended grasses, other plant material and other debris. The grass and other debris can wrap around and collect on the valve seat and its support strut(s). Debris collecting on the valve seat and strut obstructs the flow through the regulation gap and can interfere with the movement of the plunger. The debris can impair the operation of the pressure regulator, causing the pressure of the output flow to vary from the desired output pressure, reducing the rate of flow through the pressure regulator, and causing excessive pressure losses through the regulator. There is a long felt need for improvements to flow-through pressure regulators that reduce the tendency for debris collecting in the regulators.

BRIEF SUMMARY OF THE INVENTION

A pressure regulator has been invented having a valve seat and inlet to a plunger that are at an oblique angle to the flow passages in the inlet of the regulator and through the plunger. The valve seat and inlet to plunger are also oblique to the axis of the inlet flow passage that leads to the plunger. Orienting obliquely the valve seat and inlet to the inlet and plunger flow passages reduces the angles of the turns made by the water flowing through the inlet passage and into the plunger flow passage. Reducing the turning angles allows for more uniformly laminar water flow from the inlet passage and into the plunger passage. Similarly, the more uniformly laminar flow reduces turbulence as the water enters the plunger flow passage and reduces the eddy currents that may form in the inlet flow passage near the valve seat. In view of the reduction in turbulence and eddy currents, the risk that debris will catch on an edge of the valve seat, on the inlet to the plunger or become caught in an eddy current within the pressure regulator is reduced by orienting the inlet to the plunger and valve seat at an oblique angle to the axis of the plunger.

In a first embodiment, the pressure regulator may include: a housing including an inlet flow passage and an outlet flow passage; a plunger reciprocally mounted in the housing and including a plunger flow passage; an inlet to the plunger flow passage, wherein the inlet is aligned with a plane oblique to an axis of the plunger flow passage; and a valve seat fixed to the housing and positioned between the inlet flow passage and the inlet to the flow passage of the plunger, wherein the valve seat is configured to abut the inlet to the plunger flow passage while the plunger is advanced upstream in the housing.

The plane aligned with the inlet to the plunger may be at an angle with respect to the axis of the plunger flow passage of at least ten degrees. The valve seat may be parallel to the plane.

The inlet to the plunger flow passage may be elliptical and the plunger flow passage may be circular in a cross section perpendicular to the axis of the plunger flow passage.

The pressure regulator may include a strut extending from an inside wall of the housing and supporting the valve seat, wherein the strut has a triangular shape in cross section and an apex of the triangular shape extends into the inlet flow passage and the base of the triangular shape is integral with the housing, such as integral with the inside wall of the housing. A downstream surface of the strut may include the valve seat and extends downstream of the valve seat to a junction with the inside wall of the housing.

The pressure regulator may include an annular seal retainer within the housing, wherein an upstream surface of the annular seal retainer forms a downstream end of the inlet flow passage. The upstream surface of the annular seal retainer includes an opening configured to receive the plunger. The upstream surface of the annular seal retainer may be, at least partially, oriented parallel to the inlet of the plunger. For example, the upstream surface of the annular seal retainer may include a first surface portion oriented parallel to the inlet of the plunger and a second surface portion oriented parallel to a plane perpendicular to the axis of the plunger flow passage.

In another embodiment, the pressure regulator may include: an inlet cap including an inlet flow passage; an outlet cap including an outlet flow passage, wherein the outlet cap is connected to the inlet cap such that the inlet flow passage is in fluid communication with the outlet flow passage; a hollow plunger reciprocally mounted within the inlet cap and the outlet cap; a plunger flow passage within the hollow plunger and extending axially through the plunger, wherein an inlet to the plunger flow passage is open to the inlet flow passage and an outlet of the plunger flow passage is open to the outlet flow passage; and the inlet to the plunger flow passage is aligned with a plane oblique to an axis of the plunger flow passage.

DETAILED DESCRIPTION OF THE INVENTION

Figure 1:
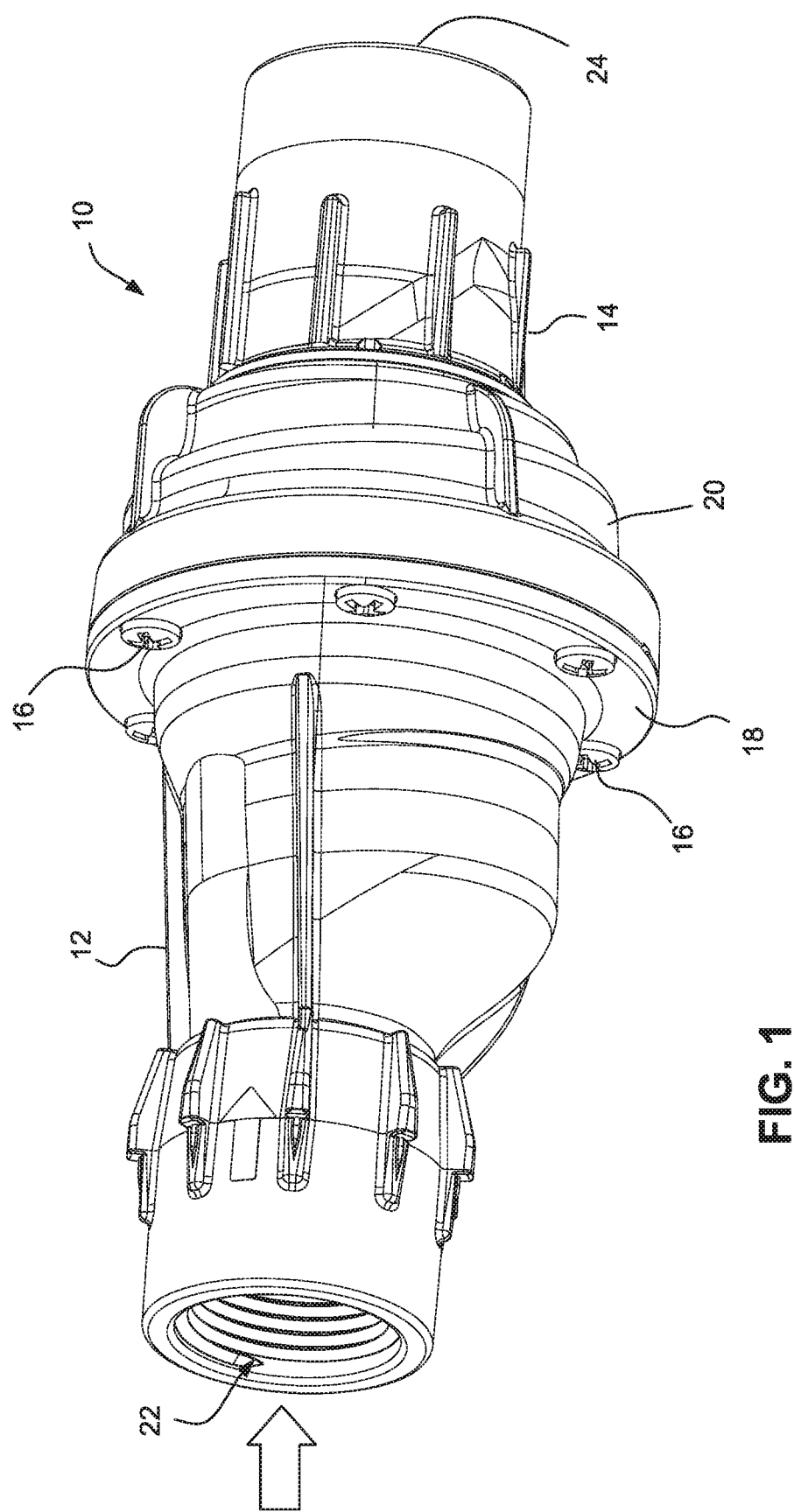
FIG. 1 is a perspective view of a first embodiment of a flow-through pressure regulator with an oblique inlet to the plunger.
Figure 2:
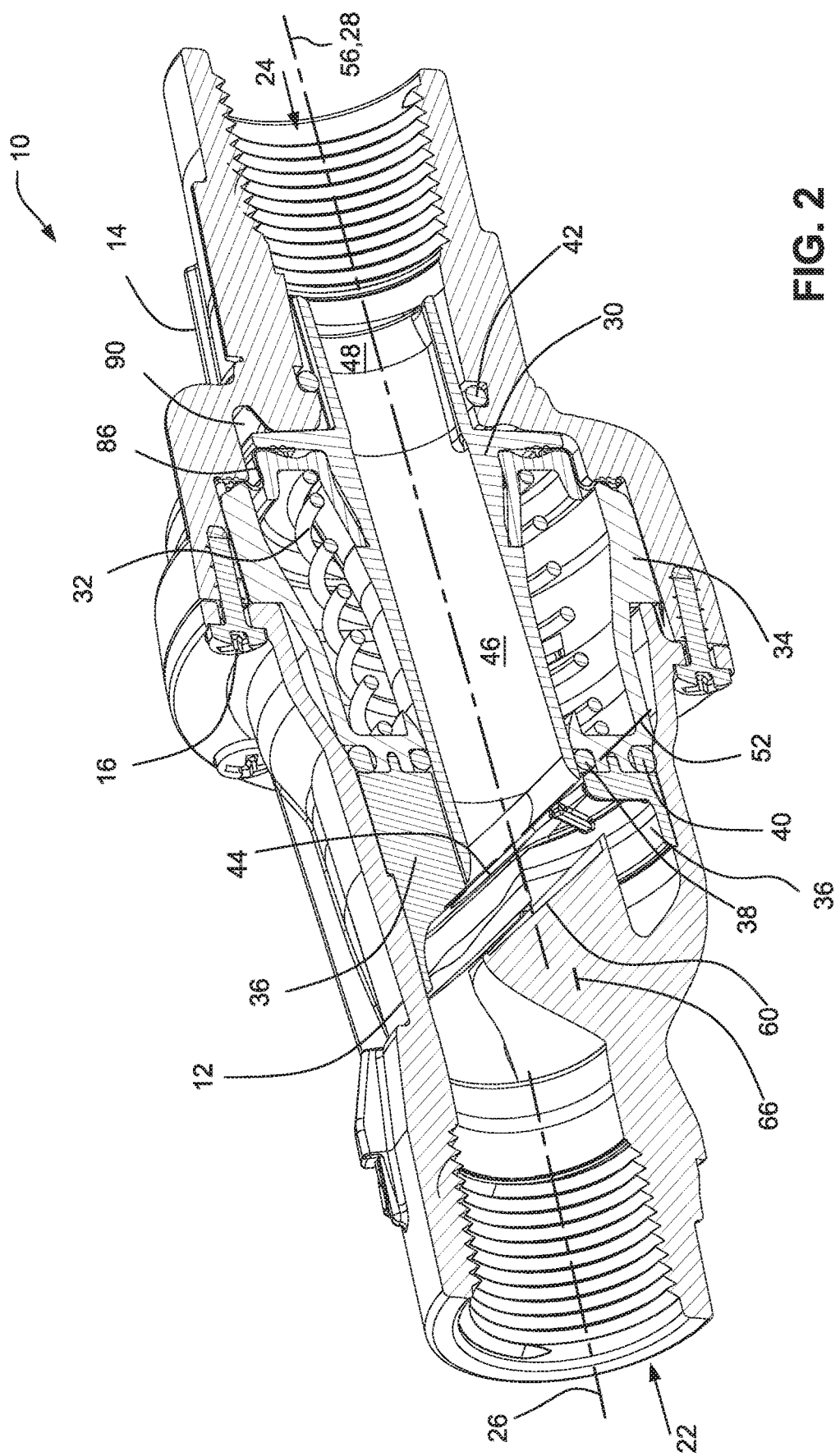
FIG. 2 is a perspective view of the first embodiment of the flow-through pressure regulator shown in cross section and showing an open inlet to the plunger.
Figure 3:
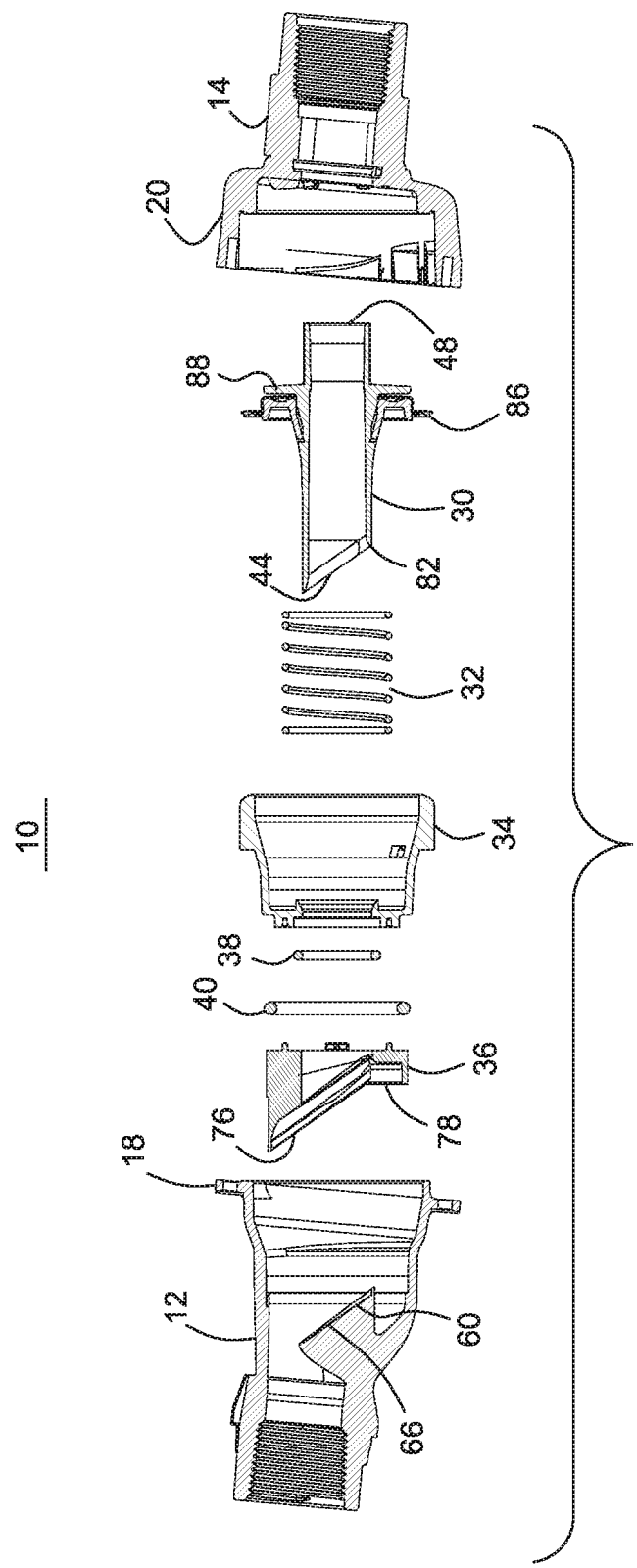
FIG. 3 is an exploded view of the first embodiment of the flow-through pressure regulator showing each component in cross section.

FIGS. 1 to 5 show a first embodiment of a flow-through type pressure regulator 10 with an oblique inlet 44 to the plunger 30 within the regulator. The pressure regulator 10 includes a housing formed by an inlet cap 12 and an outlet cap 14. The inlet and outlet caps may be connected by fasteners 16, such as screws engaging internal threads in one of the inlet or outlet caps. The fasteners 16 may extend through holes in an annular flange 18 at an end of the inlet cap 12 and engage threaded holes in a flange 20 of the outlet cap.

The inlet cap 12 includes an inlet flow passage 22, and the outlet cap 14 includes an outlet flow passage 24. The inlet and outlet flow passages may have straight axes 26, 28. The axis 26 for the inlet flow passage 22 may be coaxial with the axis 28 for the outlet flow passage 24. Alternatively, the axis of the inlet flow passage may be offset from the axis of the outlet flow passage, as is in the second and third embodiments 92, 114 of the flow-through pressure regulator shown in FIGS. 6 and 8. The offset of the axes may be such that the inlet and outlet flow passages are parallel and do not intersect, or the offset may be such that the axis of the inlet flow passage and outlet flow passages intersect, such as downstream of an outlet of the plunger.

The inlet and outlet flow passages 22, 24 may have threaded surfaces on inside surfaces, respectively, of the inlet cap 12 and the outlet cap 14. The threaded surfaces receive water pipes (not shown) connected to the pressure regulator. The water pipe connected to the inlet flow passage provides water under pressure to the pressure regulator from a water supply pipe. A vertical water pipe (not shown) may connect the pressure regulator to the water supply pipe. The outlet flow passage 24 may be connected to a sprinkler assembly that hangs or is otherwise supported by the pressure regulator. Alternatively, the pressure regulator may be coupled to a spray nozzle at the radial end of a water pipe for a center pivot irrigation system. The water pipe coupled to the inlet to the pressure regulator may be coaxial with the axis 26 of the inlet flow passage 22. Similar, the water pipe coupled to the outlet to the pressure regulator may be coaxial with the axis 28 of the outlet flow passage 24.

In addition to the inlet and outlet caps 12, 14, the components of the pressure regulator 10 include a plunger 30, a helical spring 32, an annular liner 34 and an annular seal retainer 36. A dynamic O-ring 38 and a static O-ring 40 are sandwiched between and held in place by the liner 34 and annular seal retainer 36. A damper O-ring 42 is seated in an annular groove in the outlet cap 14 and dampens vibration of the plunger in the outlet cap.

The plunger 30 has an oblique inlet 44, a plunger flow passage 46 extending from the inlet 44 to an outlet 48. The plunger flow passage 46 provides a flow passage for water flowing from the inlet flow passage 22 of the inlet cap 12 to the outlet flow passage 24 of the outlet cap 14. The flow passage through the pressure regulator 10 includes the inlet flow passage 22, the plunger flow passage 46 and the outlet flow passage 24.

The oblique inlet 44 to the plunger is at an upstream end of the hollow plunger. The inlet is oriented along a cut plane 52 through the end of the plunger that is at an angle 54 with respect to the axis 56 of the plunger. Because of the angled cut, the inlet may be elliptical especially if the plunger is cylindrical and circular in cross section along a plane perpendicular to the axis 56.

Figure 5:
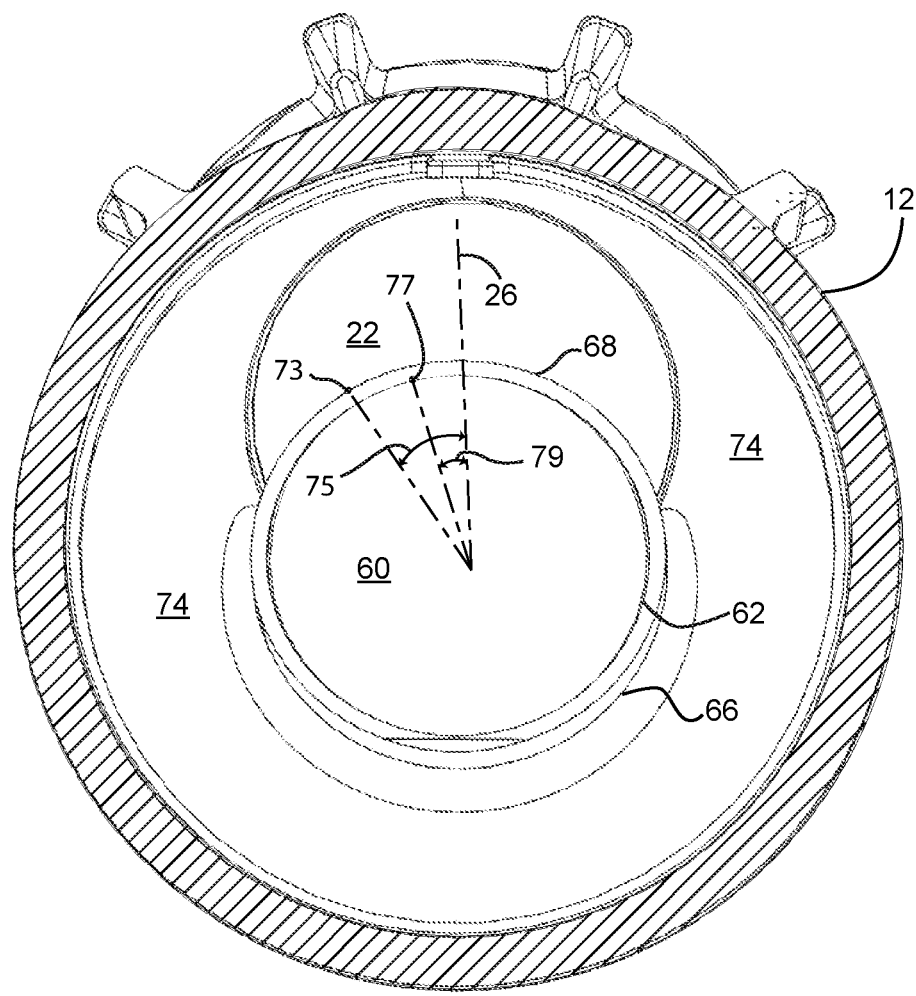
FIG. 5 is an end view of the inlet housing, wherein the view is such that the valve seat is in the same plane as the figure.

The oblique inlet 44, specifically the rim of the end of the plunger, is in or parallel to a two-dimensional plane 52. The plane 52 and the inlet 44 form an angle 54 with respect to the axis 56 of the plunger, as is shown in FIG. 5. The angle 54 is oblique and may be in a range of 80 degrees to 45 degrees, such as 75, 65, 55 or 50 degrees. The axis 56 and the plunger flow passage 46 may be straight throughout the length of the plunger flow passage 47.

The inlet 44 to the plunger abuts against a valve seat 60 while the plunger is advanced forward in the pressure regulator to a closed position. While in a closed position, the valve seat and plunger block water flow through the pressure regulator.

As shown in FIG. 5, the valve seat 60 has an elliptical disc shape wherein the outer perimeter of the elliptical valve seat may be slightly larger, e.g., less than five percent, in area than the area of the inlet 44 to the plunger. The valve seat may have a flat surface throughout its area or an annular ring that is flat and conforms to the edge of the inlet 44 of the plunger. The surface of the valve seat may be configured to receive the inlet 44 of the plunger along the entire edge of the inlet, even if the inlet is not entirely in a plane.

An annular ridge 62 (FIGS. 4 and 5) at the outer perimeter of the valve seat may extend downstream from the valve seat a short distance, such as less than one-eighth of an inch (3.175 mm) The ridge may assist in preventing the inlet 44 to the plunger from sliding over the valve seat 60, while the inlet to the plunger abuts the valve seat.

The valve seat 60, or at least a portion of the valve seat, is configured to receive and form a seat for the plunger inlet 44 when the plunger is moved forward to a closed position. The plunger inlet 44 seats on the valve seat 60 to close a gap 64 between the inlet and the valve seat. Closing the gap stops water flow through the pressure regulator. Because the valve seat is configured to stop water flow, the shape of the portion of the valve seat that receives the inlet to the plunger should be the same as, e.g., mirror, the shape of the front edge of the inlet.

The gap 64 is the narrowest portion of the flow passage through the pressure regulator. The gap forms a flow restriction in the pressure regulator. The length of the gap, which is the distance between the valve seat and the inlet to the pressure regulator, determines the area and/or volume of the annular flow passage through the gap. The length of the gap determines the water flow into the plunger and through the outlet flow passage. Similarly, the gap determines the degree to which the water pressure in the outlet flow passage matches the pressure in the inlet flow passage. The narrower the gap, the greater reduction in water pressure between the outlet flow passage and the inlet flow passage.

The valve seat 60 is parallel to the inlet 44 of the plunger. The valve seat is at the same angle 54 with respect to the axis 56 of the plunger as is the inlet 44 to the plunger. The valve seat may be offset from the axis 26 of the inlet flow passage. The offset of the valve seat 60 allows the valve seat to be shifted to one side of the inlet flow passage and thereby be less of an obstruction to water flowing through the inlet flow passage than if the valve seat were centered with the inlet flow passage.

That valve seat 60 is supported by and integral with a strut 66. The strut and valve seat may be integral with the inlet cap 12 such that the valve seat, strut and inlet cap are a single piece component. The valve seat 60 and strut 66 may be fixed to the inlet cap 12 such that they are immovable with respect to the inlet cap. The strut 66 may have a generally triangular cross section with respect to a plane parallel to the axis 26 of the inlet flow passage. The strut 66 may have an outer surface 68 extending from an inside wall 70 of the inlet cap 12 to the ridge 62 of the valve seat 60. The front of the outer surface 68 of the strut may be convex with respect to a plane parallel to and extending through the axis 26. The front of the outer surface 68 may be a smooth surface that is sloped along the crest of the convex shape at a constant or gradually decreasing angle 72 from the inside wall 70 to the ridge 62. The angle 72 is between the inside wall 70 immediately upstream of the strut and the crest 73 of the outer surface 68 of the strut. The outer surface 68 smoothly transitions from the front of the strut, along the sides of the strut to the back of the strut. The back of the outer surface 68 extends outward from the inside wall 70 of the inlet cap and downstream to the ridge 62 along the water flow through the inlet cap.

Figure 4:
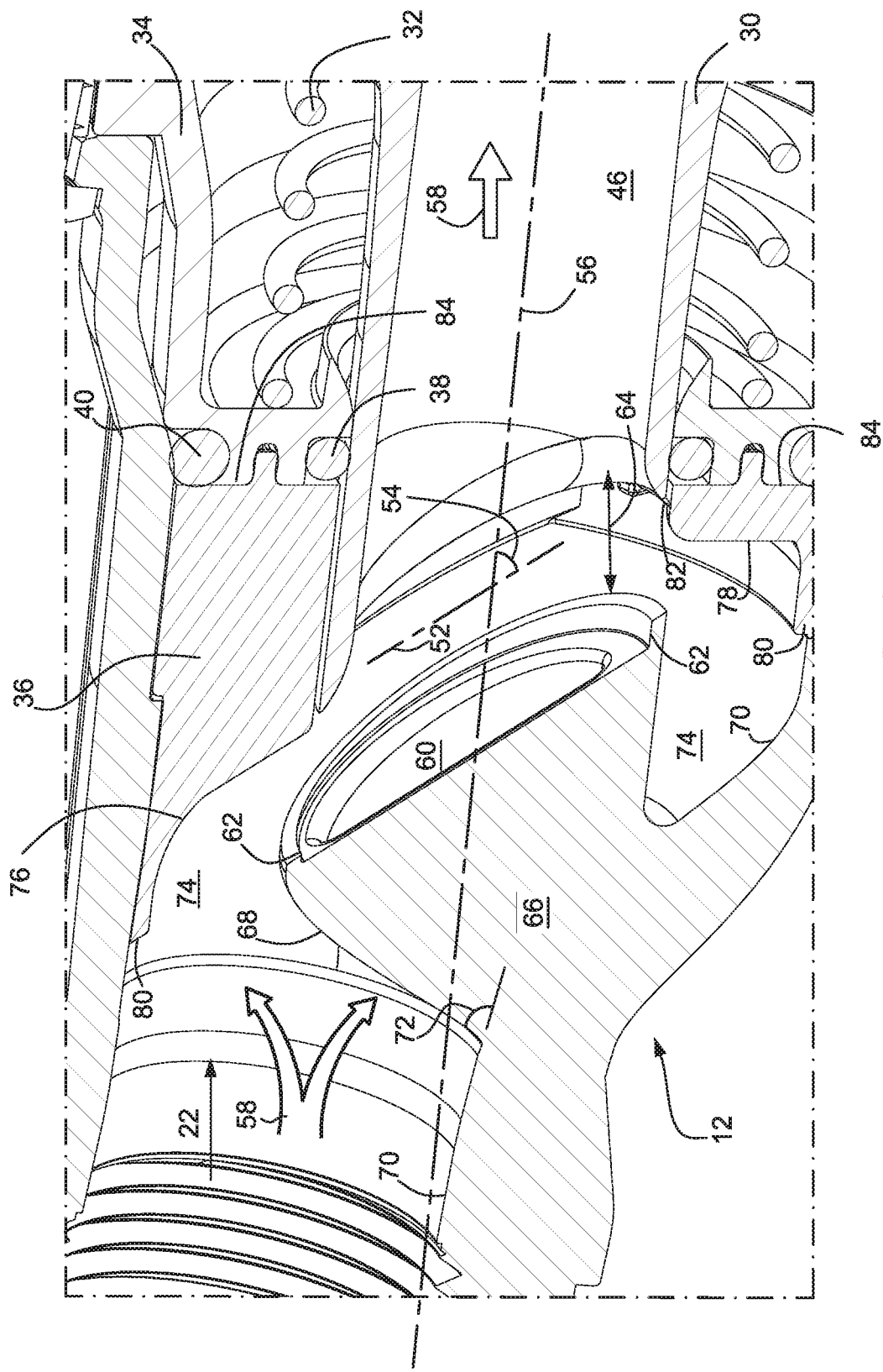
FIG. 4 is an enlarged side view of the first embodiment of the flow-through pressure regulator that shows the valve seat and inlet to the plunger portion of the pressure regulator, which is shown in cross section.

The crest 73 of the outer surface of the strut 66 may or may not be parallel to the axis 26 of the inlet flow passage. The crest 73 is the apex of the concave outer surface 68 and extends from the inner wall of the inlet cap to the nose of the strut. FIG. 4 shows the crest parallel to the axis 26. FIG. 5 shows the crest 73 offset from the axis 26 by a strut offset angle 75 such as 22.5 degrees or in a range of ten degrees to 40 degrees. Similarly, the forward most point, e.g., nose, 77 of the valve seat 60 may be aligned with the axis 26 of the inlet flow passage or offset by a valve seat offset angle 79 from the axis 26. The valve seat offset angle 79 may be about one-half the strut offset angle 75. For example, if the strut offset angle 22.5 degrees the valve seat offset angle is 11.5 degrees. Providing angular offsets of the crest of the strut and/or the nose of the valve seat with each other and with the axis 26 of the inlet cap may reduce Karman vortex shedding of the water flowing through the gap 64 at certain flow conditions (Reynolds numbers).

A generally annular chamber 74 is formed between the inside wall 70 of the inlet cap 12, the upstream surfaces 76, 78 of the annular seal retainer 36 and the outer surface 68 of the strut. Water flows 58 through the inlet flow passage 22 into the annular chamber 74 and into the inlet 44 of the plunger, while the inlet 44 is not seated on the valve seat and a gap 64 between the inlet and the valve seat. The annular chamber 74 extends around the strut 66. The upstream outer surface of the annular chamber 74 is formed by the inside wall 70 of the inlet cap. The downstream outer surface of the annular chamber 74 is formed by the upstream surfaces of the annular seal retainer 36.

The upstream surface of the annular seal retainer include a first surface portion 76 that is parallel to the plane 52 and is generally parallel to the valve seat 60 and the inlet 44 to the plunger. The second surface portion 78 of the upstream surface of the annular seal retainer is generally perpendicular to the axis 26 of the inlet cap. The first surface portion 76 is upstream of the second surface portion 78. The first and second surface portions 76, 78 meet along a line which may be aligned with a downstream most point 82 of the inlet 44 to the plunger. The inlet 44 of the plunger may align with the inner edge of the first surface portion 76 while the plunger is retracted and the gap 64 is wide.

The water flow through the annular chamber 74, through the gap 64 between the valve seat 60 and the inlet 44 to the plunger is generally parallel to the plane 52. Because the plane 52 is oblique to the axes 26, 56 of the plunger and inlet flow path, the water flow path is also generally oblique to these axes. Orienting obliquely the annular chamber 74, the gap 64, the valve seat 60 and the inlet 44 to plunger reduces the angles that the water flow turns from the inlet flow passage 22, through the gap and into the plunger, as compared to the generally 90-degree turns through which water flows in conventional pressure regulators.

Reducing the water turning angles allows for more uniformly laminar water flow from the inlet passage and into the plunger. Similarly, the more uniformly laminar flow reduces turbulence as the water enters the plunger flow passage and reduces the eddy currents that may form in the inlet flow passage near the valve seat. In view of the reduction in turbulence and eddy currents, the risk that debris will catch on an edge of the valve seat or of the inlet to the plunger or become caught in an eddy current within the pressure regulator is reduced by orienting the inlet to the plunger and valve seat at an oblique angle to the axis of the plunger.

The first and second surface portions 76, 78 of the upstream surface of the annular seal retainer 36 together form a bowel having an opening around the inlet 44 to the plunger. The bowel forms a surface which directs water flow from the inlet flow passage 22 to the inlet 44 of the plunger 30. The radially outermost edge(s) of the first and second surface portions 76, 78 is an annular ridge 80 adjacent the inside wall 70 of the inlet cap. The ridge 80 may be narrow and be adjacent the inside wall 70 to not form a substantial obstruction to water flow through the inlet passage. Alternatively, the ridge 80 may abut against a ledge in the inside wall of the inlet cap to avoid disrupting water flow through the inlet flow passage.

From the ridge 80, the first and second surface portions 76, 78 of the upstream surface of the annular seal retainer 36 slope in a downstream direction towards a center opening in the annular seal retainer 36 that receives the plunger. The slope of the first and second portions 76, 78 may be greatest near the ridge 80 and gradually become either parallel to plane 52 for portion 76, or perpendicular to the axis 26 of the inlet flow passage for portion 78, and have sharp slopes that become gradually smaller along a radial direction.

The first surface portion 76 of the annular seal retainer is parallel to the plane 52 of the plunger inlet 44. The first surface portion may extend entirely or nearly entirely around the opening in the annular seal retainer for the plunger. The second surface portion 78 may be generally perpendicular to the axis 26 of the inlet flow passage or to the axis 56 of the plunger. The orientation of the second surface portion 78 as parallel to one of the axes 26, 56 allows for a reduced thickness of the annular seal retainer as compared to having the first surface portion forming the entire upstream surface of the annular seal retainer. However, it is not necessary for the thickness of the annular seal retainer to be minimized. Thus, the second surface portion 78 is optional and the upstream surface of the annular seal retainer may be the first surface portion which is parallel to the inlet 44 of the plunger.

The downstream annular end 84 of the annular seal retainer is generally perpendicular to the axis 26 of the inlet flow passage or the axis 56 of the plunger. The downstream annular end 84 abuts against an upstream annular end of the annular liner 34. Annular ridges on the downstream end 84 of the annular seal retainer 36 and on the upstream end of the annular liner 34 seat in one another to align the annular seal retainer 36 with respect to the annular liner 34. In addition, the ridges and the ends of the annular seal retainer and annular liner provide annular enclosures for the O-rings 38, 40. The outer O-ring 40 forms a seal between the inner wall of the inlet cap 12, and the ends of the annular seal retainer and annular liner. The inner O-ring seal 38 is a dynamic seal between the outer surface of the plunger 30 and the ends of the annular seal retainer 36 and the annular liner 34.

The annular liner 34 houses the helical spring 32 which biases the plunger 30 towards an open position in which the plunger is slid away from the valve seat expanding the gap 64. One end of the helical spring 32 is against an annular inside surface of the annular liner which is in a fixed position within the pressure regulator. The opposite end of the helical spring 32 is pressed against a deformable annular diaphragm 86 that is fixed to the plunger and extends radially outward from the plunger. The radially outer rim of the diaphragm 86 is clamped between a downstream annular edge of the liner 34 and an annular ledge on an inside surface of the outlet cap 14. The upstream side of the diaphragm 86 may be at an ambient pressure, which is achieved by venting the liner 34 to the atmosphere through vent holes in the liner and one or both of the inlet and outlet caps.

An annular rigid flange 88 on the plunger extends radially outward from the plunger. The flange 88 provides support for the diaphragm at a downstream side of the diaphragm. The flange 88 also serves as a rigid stop to limit the movement of the plunger in a downstream direction. The downstream side of the flange 88 abuts against an annular surface on the inside of the outlet cap to stop downstream movement of the plunger.

An annular diaphragm chamber 90 is formed between the downstream side of the diaphragm 86 and an annular recess in the outlet cap. The diaphragm chamber 90 is in fluid communication, e.g., open, to the outlet flow passage 24. Water pressure in the outlet flow passage 24 is substantially the same as the water pressure in the diaphragm chamber 90 because there is fluid communication around and through the damper O-ring 42.

The water pressure in the diaphragm chamber 90, particularly the water pressure above ambient pressure, pushes the plunger 30 towards the valve seat by acting on an effective annular area of the diaphragm 86 attached to the plunger. While the pressure in the diaphragm chamber 90 is at or below a threshold pressure level, the force applied to the plunger and diaphragm by the helical spring 32 is greater than the force due to water pressure applied to the diaphragm 86. While the water pressure is below the threshold level, the plunger is moved to a downstream most position and the gap 64 between the plunger inlet and valve seat is greatest. While the gap is greatest, the pressure drop is smallest between the water pressure in the inlet flow passage and that of the outlet flow passage.

As the water pressure in the outlet flow passage 24 increases, the pressure in the diaphragm chamber 90 similarly increases. As the pressure in the diaphragm chamber 90 increases above the threshold pressure level, the pressure causes the diaphragm to deflect and advance the plunger towards the valve seat. The advance reduces the gap 64 and increases the pressure drop through the pressure regulator and thereby reduces the pressure in the outlet flow passage. By advancing and retracting the plunger and reducing and increasing the gap 64, the pressure regulator automatically maintains a generally uniform water pressure in the outlet flow passage while the pressure in the inlet flow passage is above the threshold level.

Figure 6:
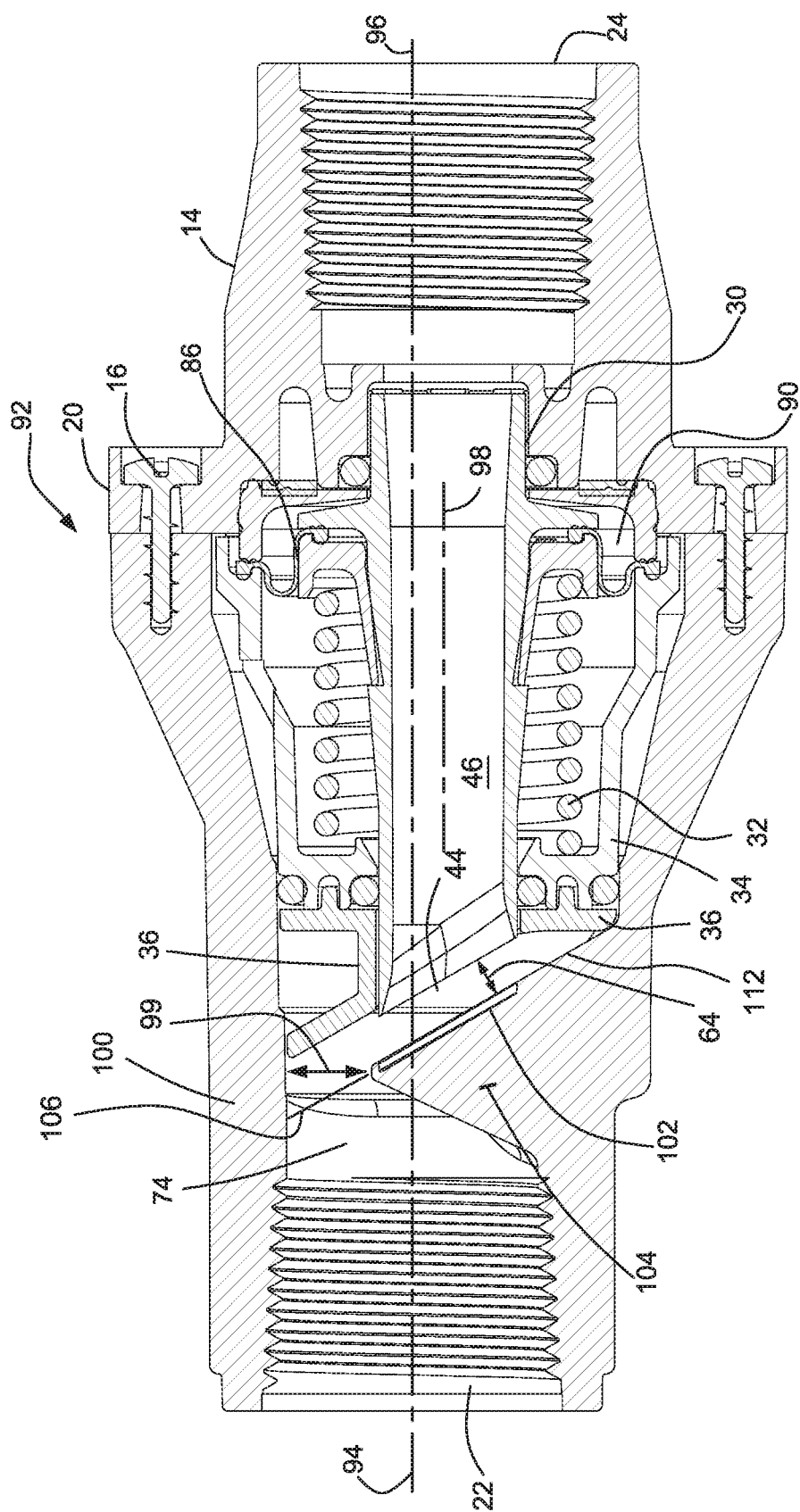
FIG. 6 is a view of a cross section of a second embodiment of a flow-through pressure regulator with an oblique inlet to the plunger, wherein the view shows the pressure regulator in cross section.

FIG. 6 shows in cross section a second embodiment of a flow-through pressure regulator 92 with an oblique inlet to the plunger, wherein the view shows the pressure regulator in cross section. The axis 94 of the inlet flow passage is the same as the axis 96 of the outlet flow passage. The axes 94, 96 of the inlet and outlet flow passages are parallel and offset from the axis 98 of the plunger 30. Shifting the plunger 30 away from the axes 94, 96 of the inlet and outlet flow passages increases the width of a flow passage 99 between the crest 73 of the strut 104 and the interior wall of the inlet flow passage in annular chamber 74. This flow passage 99 allows a portion of the water flowing through the inlet flow passage 22 to flow towards the inlet 44 of the plunger without flowing around the strut 104.

Figure 7:
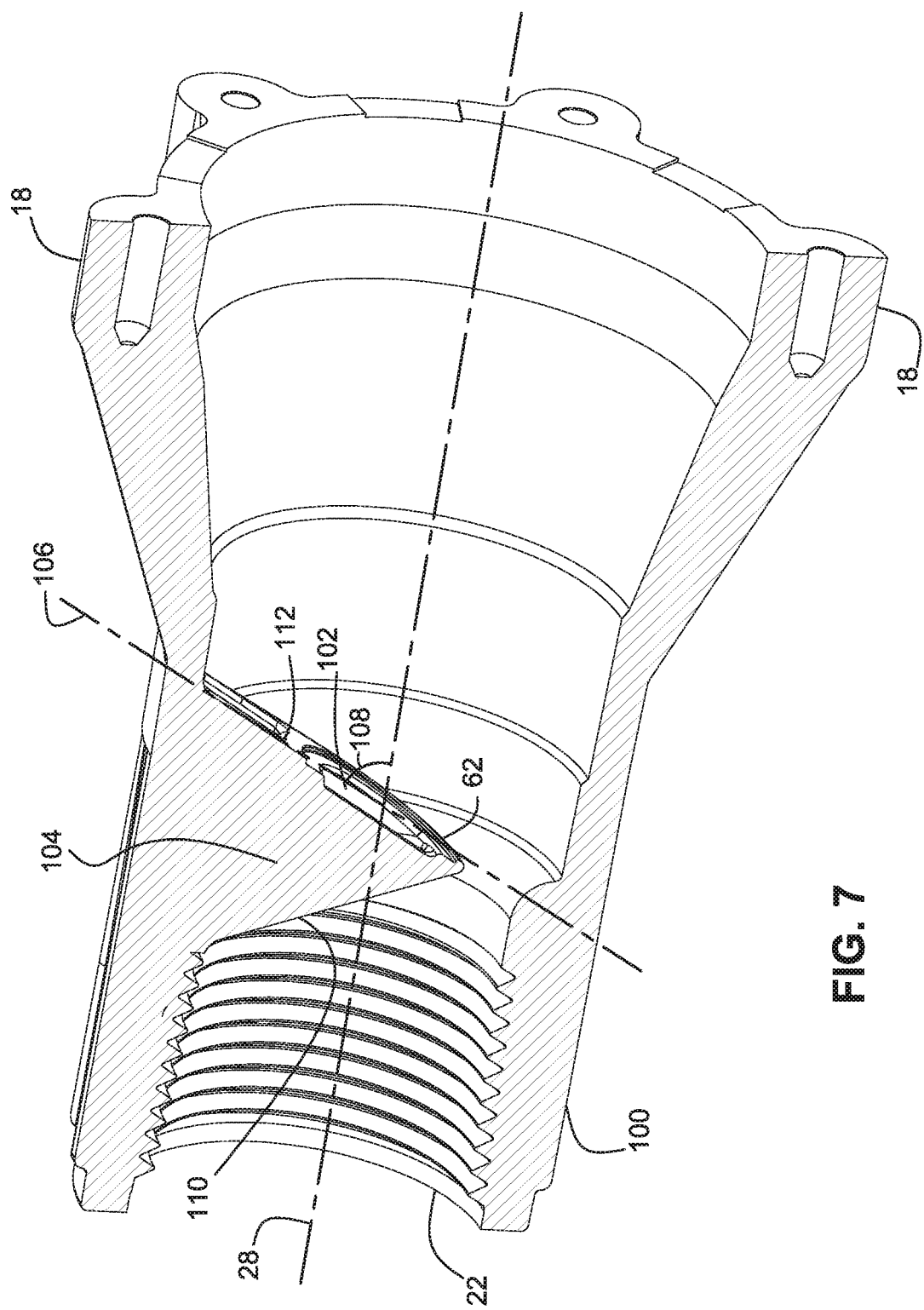
FIG. 7 is a perspective view of a cross section of the inlet housing of the second embodiment of the flow-through pressure regulator shown in FIG. 7.

FIG. 7 shows the inlet cap 100 of the second embodiment of the flow-through pressure regulator 92. The inlet cap 100 includes a valve seat 102 supported by a strut 104. The valve seat 102 is elliptical and is configured to seat an inlet of a plunger which is similarly elliptical. The valve seat 102 is aligned with a plane 106 that is oblique with respect to the axis 28 of the inlet cap 100. The angle 108 between the plane 106 of the valve seat 102 and the axis 28 of the inlet cap may be in a range of 85 degrees to 45 degrees, such as 80, 75, 70, 65, 60, 55 or 50 degrees. The elliptical shape of the valve seat 102 and the matching inlet to the plunger is dependent upon the angle 54. The greater the angle 54, the greater the length of the major axis of the ellipse of the valve seat and inlet to the plunger.

The strut 104 is similar in many respects to the strut 66. The similarities include that the strut 104 extends from an interior side wall of the inlet cap 100, the strut 104 is generally triangular in cross section along a plane parallel to and extending through the axis 28, and the strut 104 and valve seat 102 are fixed with response to the inlet cap 100.

The upstream surface 110 of the strut is sloped, such as a linear slope of 45 degrees, from the inside wall of the inlet cap to the ridge 62 of the valve seat. The upstream surface 110 may be concave with an apex along a ridge extending from the inside wall to the ridge. The downstream surface 112 of the strut is planar and includes a recess that is the valve seat 102. The downstream surface may be parallel to the plane 106 that includes the valve seat.

Figure 8:
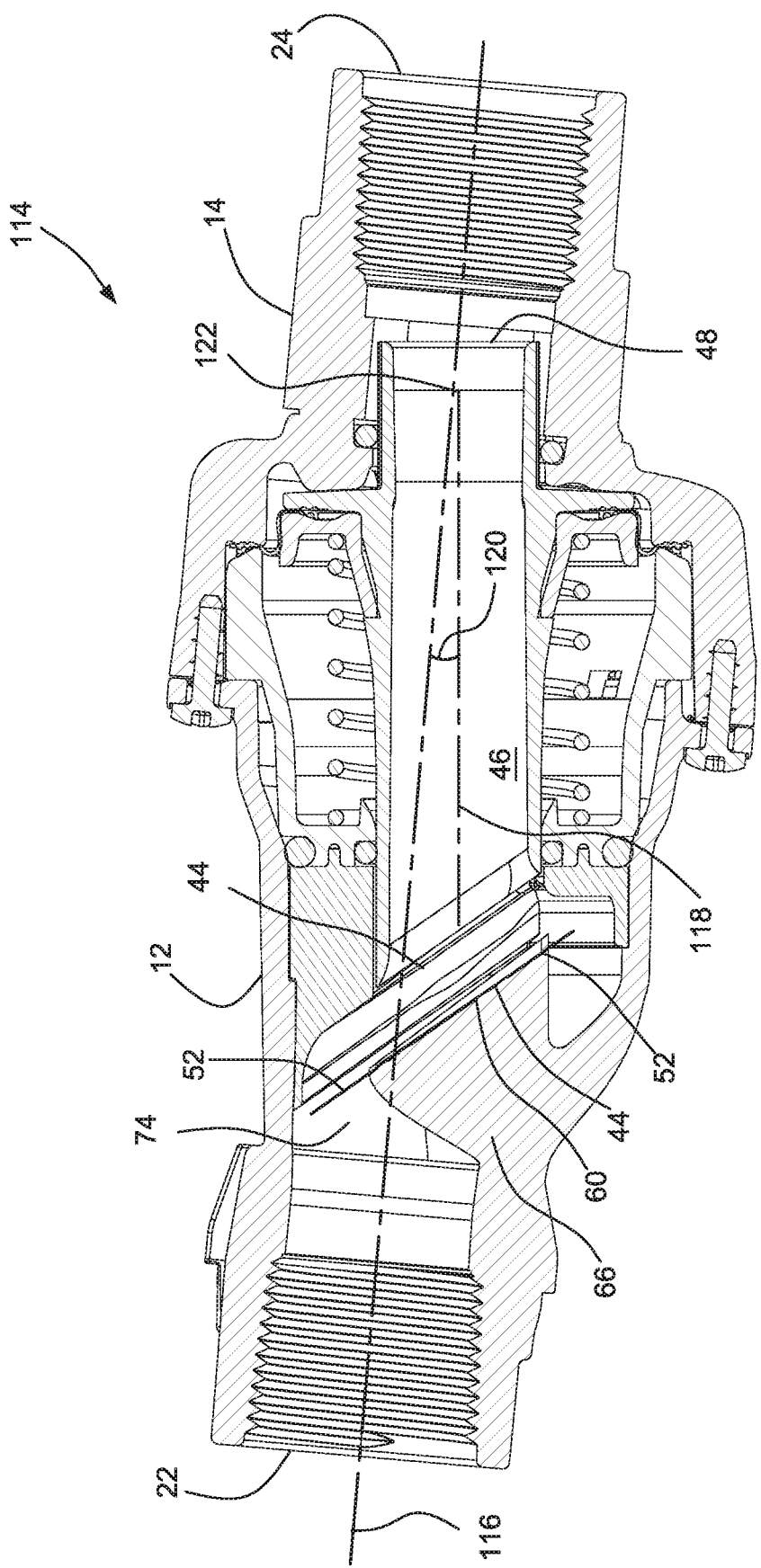
FIG. 8 is a view of a cross section of a third embodiment of a flow-through pressure regulator with an oblique inlet to the plunger, wherein the view shows the pressure regulator in cross section.

FIG. 8 shows a third embodiment 114 of a flow-through pressure regulator with an oblique inlet to the plunger, wherein the axis 116 of the inlet flow passage is the same as the axis of the outlet flow passage 24. The axis 118 of the plunger 30 is offset by an angle 120 (angular offset) from the axis 116 of the inlet and outlet flow passages. The angle 120 may be in a range of five degrees to fifteen degrees. The axis 118 of the plunger may intersect the axis 116 of the inlet and outlet flow passages at a point 122 in a downstream section of the plunger flow passage 46 or in the outlet flow passage.

The angle 120 of offset with respect to the axis of the plunger shifts the inlet 44 to the plunger 30, the valve seat 60 and strut 66 to one side of the annular chamber 74 between the downstream side of the inlet cap 12 and the upstream side of the annular seal retainer 36. The offset of the plunger inlet, valve seat and strut shown in the third embodiment 114 is similar to offset shown in the first embodiment of the pressure regulator 10 and the second embodiment 92.

In the third embodiment 114 of the pressure regulator, the inlet 44 to the plunger and the valve seat 60 are parallel to a plane 52 that is oblique to the axis 116 of the inlet and outlet flow passages and to the axis 118 of the plunger. The plane 52 in the third embodiment has a similar orientation to the pressure regulator as does the planes 52, 106 in the first and second embodiments 10, 92 of the pressure regulator.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention is:

1. A pressure regulator comprising:
a housing including an inlet flow passage and an outlet flow passage;
a plunger reciprocally mounted in the housing and including a plunger flow passage;
an inlet to the plunger flow passage, wherein the inlet to the plunger flow passage is aligned with a plane oblique to an axis of the plunger flow passage; and
a valve seat fixed to the housing and positioned between the inlet flow passage and the inlet to the plunger flow passage of the plunger, wherein the valve seat is configured to abut the inlet to the plunger flow passage while the plunger is advanced upstream in the housing.

2. The pressure regulator of claim 1, wherein the plane aligned with the inlet to the plunger flow passage is at an angle with respect to the axis of the plunger flow passage of at least ten degrees.

3. The pressure regulator of claim 1, wherein the inlet to the plunger flow passage is formed by an upstream edge of the plunger and the entire upstream edge is in the plane.

4. The pressure regulator of claim 1, wherein the valve seat is parallel to the plane.

5. The pressure regulator of claim 1, wherein the inlet to the plunger flow passage is elliptical.

6. The pressure regulator of claim 5, wherein the plunger flow passage is circular in a cross section perpendicular to the axis of the plunger flow passage.

7. The pressure regulator of claim 1, wherein the valve seat is elliptical, and the plunger flow passage is circular in a cross section perpendicular to the axis of the plunger flow passage.

8. The pressure regulator of claim 1, wherein an axis of the inlet flow passage extends through the valve seat and is offset from the axis of the plunger flow passage.

9. The pressure regulator of claim 1, further comprising a strut extending from an inside wall of the housing and supporting the valve seat, wherein the strut has a triangular shape in cross section and an apex of the triangular shape extends into the inlet flow passage and the base of the triangular shape is integral with the inside wall of the housing.

10. The pressure regulator of claim 9, wherein a downstream surface of the strut includes the valve seat and extends downstream of the valve seat to a junction with the inside wall of the housing.

11. The pressure regulator of claim 1, wherein the axis to the plunger flow passage is offset from an axis of the inlet flow passage.

12. The pressure regulator of claim 11, wherein the axis of the inlet flow passage and an axis of the outlet flow passage are coaxial.

13. The pressure regulator of claim 11, wherein the axis of the plunger flow passage is parallel to the axis of the inlet flow passage.

14. The pressure regulator of claim 11, wherein the axis of the plunger flow passage intersects the axis of the inlet flow passage at a location in the plunger flow passage.

15. The pressure regulator of claim 1, wherein a forward most point of the valve seat is angularly offset from an axis of the inlet flow passage.

16. The pressure regulator of claim 15, further comprising a strut and a crest of the strut is angularly offset from the axis of the inlet flow passage.

17. The pressure regulator of claim 16, wherein an angular offset of the forward most point of the valve seat is angularly offset from the crest of the strut.

18. The pressure regulator of claim 1, further comprising an annular seal retainer within the housing, wherein an upstream surface of the annular seal retainer forms a downstream end of the inlet flow passage, the upstream surface includes an opening configured to receive the plunger and the upstream surface is, at least partially, oriented parallel to the inlet to the plunger flow passage.

19. The pressure regulator of claim 18, wherein the upstream surface of the annular seal retainer includes a first surface portion oriented parallel to the inlet to the plunger flow passage and a second surface portion oriented parallel to a plane perpendicular to the axis of the plunger flow passage.

20. A pressure regulator comprising:
an inlet cap including an inlet flow passage;

an outlet cap including an outlet flow passage, wherein the outlet cap is connected to the inlet cap such that the inlet flow passage is in fluid communication with the outlet flow passage;

a hollow plunger reciprocally mounted within the inlet cap and the outlet cap;

a plunger flow passage within the hollow plunger and extending axially through the plunger, wherein an inlet to the plunger flow passage is open to the inlet flow passage and an outlet of the plunger flow passage is open to the outlet flow passage; and the inlet to the plunger flow passage is aligned with a plane oblique to an axis of the plunger flow passage.

21. The pressure regulator of claim 20, wherein the plane aligned with the inlet to the plunger flow passage is at an angle with respect to the axis of the plunger flow passage of at least ten degrees.

22. The pressure regulator of claim 20, wherein an upstream edge of the inlet to the plunger flow passage is entirely within the plane.

23. The pressure regulator of claim 20, further comprising a valve seat attached to the inlet cap, aligned with the plane and configured to receive the inlet to the plunger flow passage.

24. The pressure regulator of claim 20, further comprising a strut extending from an inside wall of the housing and supporting a valve seat, wherein the strut has a triangular shape in cross section and an apex of the triangular shape extends into the inlet flow passage and the base of the triangular shape is integral with the inside wall of the housing.

25. The pressure regulator of claim 24, wherein a downstream surface of the strut includes the valve seat and extends downstream of the valve seat to a junction with the inside wall of the housing.

26. The pressure regulator of claim 24, further comprising an annular seal retainer within the inlet cap and the outlet cap, an upstream surface of the annular seal retainer includes an opening configured to receive the plunger and the upstream surface is, at least partially, oriented parallel to the inlet to the plunger flow passage.

27. The pressure regulator of claim 26, wherein the upstream surface of the annular seal retainer includes a first surface portion oriented parallel to the inlet to the plunger flow passage and a second surface portion oriented parallel to a plane perpendicular to the axis of the plunger flow passage.

* * * * *